United States Patent Office 2,891,483
Patented June 23, 1959

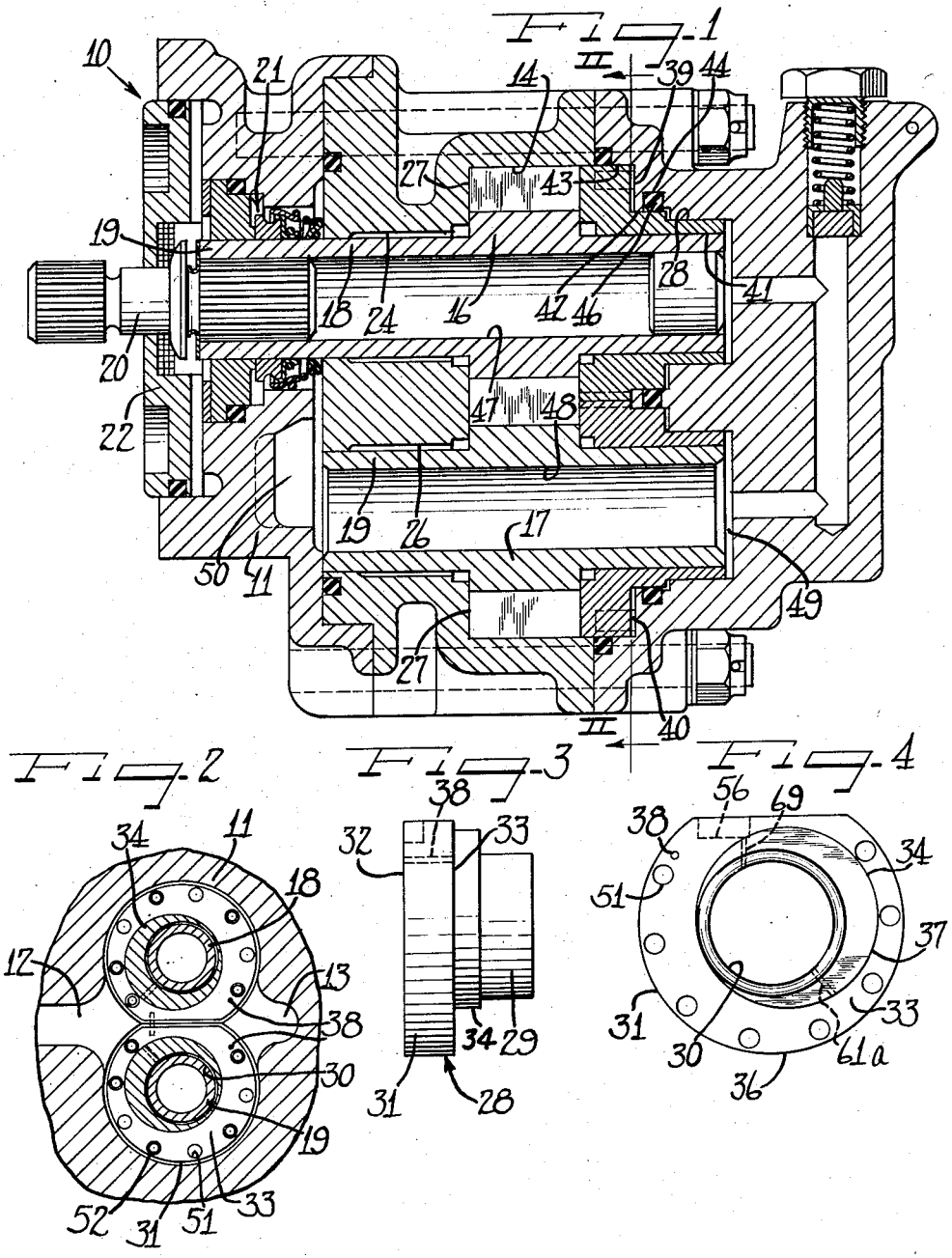

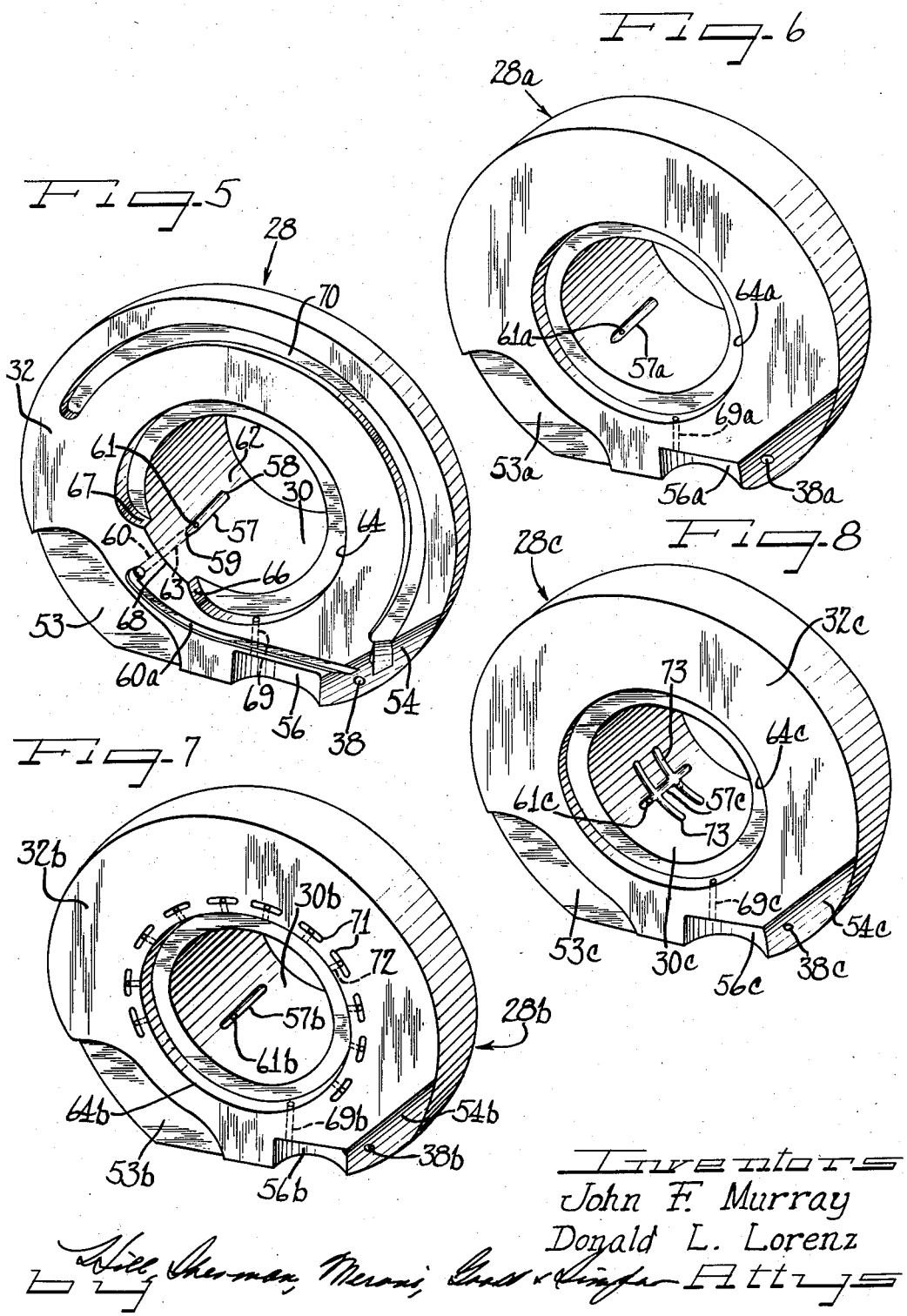

2,891,483
MOVABLE BUSHING FOR PRESSURE LOADED GEAR PUMPS

John F. Murray, Northfield, and Donald L. Lorenz, Euclid, Ohio, assignors to Thompson Ramo Wooldridge Inc., a corporation of Ohio Application April 13, 1956, Serial No. 578,115

10 Claims. (Cl. 103—126)

This invention relates generally to gear pumps and more particularly relates to improved means for hydrostatically and hydrodynamically lubricating and balancing a bearing bushing means in a pump.

Although the principles of the present invention are of general utility, particularly useful application is made in connection with aircraft fuel pumps. One of the major problems in the manufacture and construction of aircraft fuel pumps handling gasoline and other fuel compounds has been in the satisfactory hydrostatic and hydrodynamic lubrication and balancing of the bearing end plate means used in journalling and sealing the rotatable fluid displacement means of the fuel pumps. In this connection, the problem becomes particularly acute because the fuel compounds forming the pumping medium have viscosities which are far less than the viscosities of fluids normally handled by hydraulic pumps of conventional design. Accordingly, the present invention contemplates the provision of a lubricating and balancing arrangement which will function efficiently even though the pump speeds and pressures increase and the temperature of the working fluid rises.

It is an object of the present invention to provide improved means for hydrostatically and hydrodynamically lubricating and balancing bearing end plate means in a pump.

Yet another object of the present invention is to provide improved means for obtaining satisfactory lubrication and heat dissipation at bearing and journalling surfaces in a pump handling low viscosity working fluids.

Yet another object of the present invention is to provide a fuel pump of increased capacity.

Many other features, advantages and additional objects of the present invention will become manifest to those versed in the art upon making reference to the detailed description which follows and the accompanying sheets of drawings in which a preferred structural embodiment of a pump incorporating the principles of the present invention is shown by way of illustrative example.

On the drawings:

Figure 1 is a cross-sectional view of a pressure-loaded gear pump embodying the principles of the present invention;

Figure 2 is a fragmentary cross-sectional view reduced in size and taken substantially on line II—II of Figure 1;

Figure 3 is a side elevational view of the bearing end plate means provided in accordance with the principles of the present invention;

Figure 4 is an end elevational view of the bearing end plate means of Figure 3;

Figures 5, 6, 7 and 8 are perspective views of bearing end plate means similar to the bearing end plate means of Figures 3 and 4 but illustrating different forms of the present invention.

As shown on the drawings:

For clarity and understanding, the principles of the present invention are illustrated in connection with a pressure-loaded gear pump indicated generally at 10.

The pump 10 includes a casing 11 having formed therein an inlet 12 and an outlet 13 communicating with a pumping chamber 14 in which is rotated a rotary fluid-displacement means taking the form of a driver gear 16 and a driven gear 17.

Each of the gears 16 and 17 have gear shaft extensions indicated at 18 and 19, respectively, by means of which the gears may be journalled for rotation in the casing 11. On the driver gear 16, the gear shaft extension includes a coupling portion 19 splined to a driver member 20 which is adapted to be connected to a suitable source of driving power. A suitable bearing and sealing means indicated generally at 21 is retained in the casing 11 by a cover member 22. It will be understood that suitable recesses and O-ring sealing members may be provided throughout the pump to establish the necessary seals between adjoining surfaces of the pump components.

A portion of the casing 11 has bearing surfaces formed therein for corresponding gear shaft extensions 18 and 19 on the driver and driven gears 16 and 17 and such bearing surfaces are indicated by the reference numeral 24 and 26, respectively. The casing further provides a stationary sealing surface 27 for sealing and engaging against an adjoining side face of a corresponding gear 16 or 17.

On the opposite side of the gears 16 and 17, there is provided a movable pressure-loaded bushing indicated generally at 28, one bushing 28 being provided for each corresponding gear 16 and 17. Each of the bushings 28 has corresponding structural features and, accordingly, only a single set of reference numerals will be employed in referring to the separate bushings.

The bushings 28 constitute bearing end plate means and each bushing 28 consists of a generally tubular article including a cylindrical body portion 29 having a bore extending therethrough and forming a cylindrical bearing surface 30 for rotatably journalling a gear shaft extension 18 or 19 of the driver gear 16 and 17, respectively.

At one end of each bushing 28, there is provided a radially outwardly extending flange 31. The front face of the flange 31 is indicated at 32 and constitutes a sealing surface for engaging an adjoining side face of one of the gears 16 and 17. The rear face of the flange is indicated at 33 and is axially spaced from the front face 32. The pressure forces acting on the front face or sealing surface 32 of the bushing 28 vary between a minimum at the inlet side of the pump to a maximum at the outlet side of the pump. Accordingly, the back surface or motive surface 33 on the bushing 28 is arranged to increase proportionately in area from the pump inlet to the pump outlet for balancing the unequal pressure forces in the pumping chamber. In this connection, the tubular or cylindrical extension 29 of the bushing 28 is generally concentric with respect to the flange 31, however, the peripheral surface of the body portion 29 is interrupted by a shoulder 34 which is eccentrically offset towards the inlet side of the pump, thereby providing a motive surface 33 with a generally circular outer periphery 36 and a generally circular inner periphery 37, the inner periphery being eccentrically disposed with respect to the axis of the bushing 28 to thereby provide a major area on the discharge side of the pump and a minor area on the inlet side of the pump. In other words, the shoulder 34 has the effect of decreasing the extent of exposed surface area on the motive surface 33 in the region of the pump inlet. Means are provided to communicate pressure generated by the pump behind the motive surface 33 and in this connection, it may be noted that such means are provided in the present illustrative example by forming an opening 38 extending axially through the flange 31 at the discharge side of the pump.

It may be noted that the motive surface 33 is spaced from an adjoining end wall 39 provided by the casing 11 and, accordingly, the back face of the flange 31 together with means including the wall 39 of the casing 11 forms a pressure control chamber 40 to receive the pressure generated by the pump communicated therethrough by the opening 38.

In assembly, the casing 11 has a bore 41 receiving the body portion 29 of the bushing 28 and a counterbore 42 receiving the shoulder 34. A large counterbore 43 receives the flange 31. A recess 44 seats an O-ring sealing member 46, thereby isolating the pressure control chamber 40 by establishing a seal between the peripheral surface of the shoulder 34 and the casing 11. Those versed in the art will recognize that the bore 41 and the counterbore 43 are in concentric relation with respect to one another so that all critical dimensions can be maintained with great convenience. The counterbore 42 which must be eccentrically offset need not be located with extremely great accuracy because manufacturing tolerances are readily compensated for by virtue of the flexibility afforded through the utilization of the O-ring sealing member 46 between the casing 11 and the annular eccentrically offset shoulder 34.

It will be noted that the gears 16 and 17 have bores extending therethrough as indicated at 47 and 48. Moreover, the casing 11 is recessed as at 49 and 50, all of these hollow spaces being communicated with the pump inlet, thereby to maintain low pressure throughout the pump to facilitate the use of low pressure seals.

Spring means are provided to initially load the movable bearing end plate means into sealing engagement with the gears 16 and 17. In the form of the invention herein illustrated, the motive surface 33 is characterized by the formation therein of a plurality of recesses 51 bottoming coil springs 52 and engaging the wall 39 to establish a continuous biasing force urging the bushings 28 in the direction of the gears 16 and 17.

Referring now more particularly to Figures 5 through 7, the improved means for hydrostatically and hydrodynamically lubricating and balancing the bushings 28 will be described in detail.

In Figure 5, the sealing surface 32 has a relief recess 53 formed therein on the inlet side of the bushing 28, thereby to facilitate and assist in filling the spaces between the gear teeth with fluid.

On the outlet side of the bushing 28, the sealing surface 32 is particularly characterized by a chamfered recess 54 which extends tangentially and improves the discharge characteristics of the pump. The surface 32 is further characterized by a trapping relief recess indicated at 56 and located on the discharge side. The trapping relief 56 affords relief against fluid being trapped by the intermeshing of the gear teeth on the driver and driven gears 16 and 17 in the vicinity of the pump discharge or outlet 13.

It has been determined that operation of the rotary fluid displacement means or the gears 16 and 17 results in a shifting of the point of load concentration towards the inlet side of the bearing surface 30. In other words, during operation of the pump, there is a critical bearing area of contact which is subjected to a concentrated load during operation of the pump. This critical area appears to be shifted towards the inlet side of the pump. Using the orientation of Figure 5 and considering the annular bearing surface 30 as being disposed with reference to a system of rectangular coordinates with the associated gears rotating in clockwise direction, the critical area of load concentration is located in the lower left quadrant. It is contemplated, according to the present invention, therefore, to establish a system of recesses or a groove pattern formed to provide a fluid reservoir at the critical area of load concentration. In the embodiment of Figure 5, the groove pattern comprises a single, longitudinally extending groove 57 which terminates at 58 and at 59 short of the opposite ends of the bearing surface 30. A groove or passageway 60 communicates pressure generated by the pump to the reservoir formed by the groove 57, thereby to assist in the dissipation of heat from the critical area of load concentration as well as to lubricate the bearing surface 30 at this critical area. The passageway 60 is provided with a metering orifice 61, thereby to preclude excessive flow at high discharge pressure and it will be understood that the bearing areas 62 and 63 at the bearing surface 30 adjoining the ends 58 and 59 of the groove 57, respectively, will have the effect of limiting the outward flow of fluid from the reservoir, thereby permitting fluid to be bled out of opposite ends of the reservoir or groove 57 to flow circumferentially around the journalling and bearing surface 30.

In the form of the invention illustrated in Figure 5, the passageway 60 extends axially and communicates with a groove 60a formed in the sealing surface 32 and intersecting the chamfered discharge recess 54, thereby communicating full discharge pressure into the reservoir 57.

There is also provided, in accordance with the principles of the present invention, a circumferentially discontinuous counterbore 64 circumjacent the bearing surface 30 and formed in the sealing surface 32. The counterbore recess 64 has its opposite ends indicated at 66 and 67, respectively, spaced apart from one another by portions of the sealing surface 32 indicated by a separate reference numeral 68. The sealing portions 68 are located axially opposite the critical area of load concentration. Thus, the counterbored recess 64 extends around the bearing surface 30 at the portions under lesser load concentration. Full discharge pressure generated by the pump is communicated into the recess counterbore 64 by a metering passageway 69 extending between the recess 64 and the trapping relief 56.

The sealing surface 32 of the bushing 28 illustrated in Figure 5 is further characterized by the provision of a segmental arcuate groove 70. The groove 70 is located concentrically outwardly of the counterbore recess 64 and preferably outside of the root diameter of the gear teeth on the gears 16 and 17. The groove 70 extends from the chamfered recess 54 and thereby communicates pressure generated by the pump from the outlet side of the bushing 28 towards the inlet side. The groove 70 therefore has the effect of communicating fluid at increased pressure to the spaces between the gear teeth towards the inlet side of the pump and thereby distributes the forces acting on the sealing surface 32.

In Figure 6, the bushing is indicated at 28a and parts which are similar in function to corresponding parts of the bushing 28 of Figure 5 are indicated by similar reference numerals bearing the suffix A. In this form of the invention, the reservoir or groove is indicated at 57a and fluid at discharge pressure is communicated thereto by means of a metering orifice 61a communicating to a pressure control chamber 40 at a point adjacent the motive surface 33, for example, as is more clearly indicated in Figure 4. In the form of the invention indicated in Figure 6, the counterbored recess 64a is circumferentially continuous and fluid at discharge pressure is communicated thereto by means of the passage 69a communicating with the trapping relief 56a.

In the embodiment of Figure 7, the bushing is indicated at 28b. The reservoir or groove 57b corresponds to the groove 57a of the embodiment of Figure 6 and a metering opening 61b communicates fluid at discharge pressure thereto. A circumferentially continuous counterbored recess 64b is formed in the sealing surface 32b circumjacent the bearing surface 30b. Concentrically outwardly of the counterbored recess 64b is provided an annular row of separated pockets each indicated at 71. Each respective pocket 71 communicates with pressure generated by the pump by means of a passageway 72 extending between a corresponding pocket 71 and the counterbored recess 64b. A passage 69b communicates pressure generated by the pump from the trapping relief 56b to the counterbored recess 64b. By communicating working fluid at discharge pressure individually to the separated pockets through a plurality of metering orifices, a more uniform and positive lubrication film is spread over the entire sealing surface 32b. It will be understood that the working fluid will pass through the leakage paths over the entire face provided by the sealing surface 32b.

In the embodiment of Figure 8, the bushing is indicated by the reference numeral 28c. In this form of the invention, the groove pattern includes a longitudinally extending groove 57c and also a plurality of circumferentially extending lateral grooves 73 which are formed in the bearing surface 30c and which intersect the longitudinal groove 57c, thereby to provide a plurality of pockets which will have the effect of more rapidly distributing working fluid in the critical area of bearing contact. Working fluid at pressure generated by the pump is communicated to the pattern of grooves by a metering opening 61c communicating with the pressure control chamber 40. The sealing face 32c also has a circumferentially continuous recess 64c communicating with full discharge pressure through the passageway 69c. It should be understood that the shape and the position of the groove pattern may be otherwise varied and modified according to the varying lubrication and cooling demands which are placed upon the pump by the operating requirements thereof.

In each of the arrangements described, it will be appreciated that there is provided a lubrication system wherein the working fluid is communicated to the critical area of load concentration at a flow rate which is proportioned to the pump discharge pressure and in such a manner as to prevent excessive flow at high discharge pressures. Moreover, by virtue of the provision thus made, lower bearing clearances may be provided since heat dissipation is improved and the location of pockets of fluid at high pressure at localized areas on different portions of the bushing has the effect of hydrostatically and hydrodynamically lubricating and balancing the bushing.

Although various minor modifications might be suggested by those versed in the art, it should be understood that we wish to embody within the scope of the patent warranted hereon all such modifications as reasonably and properly come within the scope of our contribution to the art.

We claim as our invention:

1. A fluid pump of the type including a housing having an inlet and an outlet, a rotatable pumping member journalled in said housing for transferring fluid from said inlet to said outlet, axially movable end plate means adapted to engage said pumping member in sealing relation and movable independently of said rotatable pumping member, a continuous generally annular motive surface on said end plate means adapted in response to application of pressure thereto to urge said end plate means towards said rotatable member to establish said sealing relation, conduit-defining means for continuously communicating pressure generated by said pump to said motive surface, said motive surface having a generally circular outer periphery concentrically disposed with respect to the axis of rotation of the pumping member and a generally circular inner periphery eccentrically disposed with respect to the axis of said pumping member, said inner periphery having its center offset towards said inlet port, a generally annular sealing surface on said end plate means to engage an adjoining side face of said rotatable member, a bore formed in said end plate means and extending therethrough concentrically of said sealing surface and providing a bearing surface for journalling said rotatable member, a counterbore formed in said sealing surface, means communicating pressure generated by said pump to said counterbore, a plurality of pockets formed in said sealing surface in an annular row concentrically outwardly of said counterbore, each pocket having means communicating pressure generated by said pump to a corresponding pocket, thereby to establish a uniform distribution of lubricant film over the entire sealing surface.

2. A fluid pump of the type including a housing having an inlet and an outlet, a rotatable pumping member journalled in said housing for transferring fluid from the inlet to the outlet, axially movable end plate means adapted to engage said pumping member in sealing relation and movable independently of said rotatable pumping member, a continuous generally annular motive surface on said end plate means adapted in response to application of pressure thereto to urge said end plate means towards said rotatable member to establish said sealing relation, conduit-defining means for continuously communicating pressure generated by said pump to said motive surface, a generally annular sealing surface on said end plate means to engage an adjoining side face of said rotatable member to establish said seal relation, a bore formed in said end plate means and extending therethrough concentrically of said sealing surface and providing a bearing surface for journaling said rotatable member, said bearing surface having localized recess means formed therein offset towards the inlet side of the pump and providing a reservoir at the center of load concentration produced by pump generated pressures acting on the rotatable pumping member, said recess means consisting of a groove pattern located in a critical area of load contact axially opposite the center of load concentration produced by the pump generated pressures acting on the rotatable pumping member when said rotatable member is rotated at operating speed, and means communicating pressure generated by the pump into said reservoir to hydrostatically and hydrodynamically lubricate said bearing surface.

3. A fluid pump as defined in claim 2, said sealing surface having a trapping relief formed therein at the discharge side thereof, and a groove formed in said end plate means extending between said recess means and said trapping relief to provide said means for communicating pressure generated by the pump into said reservoir.

4. A fluid pump as defined in claim 2, said end plate means having a groove formed therein extending between said recess means to a point adjacent said motive surface, thereby to provide said means for communicating pressure generated by said pump to said reservoir.

5. A fluid pump as defined in claim 2, said groove pattern consisting of a single longitudinally extending groove terminating short of opposite ends of said bearing surface.

6. A fluid pump as defined in claim 2, said groove pattern consisting of at least one longitudinally extending groove terminating short of the opposite ends of said bearing surface and at least one laterally extending circumferentially discontinuous groove intersecting said longitudinal groove, thereby to form a plurality of pockets at the critical area of load contact.

7. In a high pressure pump, a housing having an inlet and an outlet and providing a pumping cavity, rotary fluid-displacement means in said pumping cavity for moving fluid from said inlet to said outlet, and bearing end plate means for said cavity in said housing, said bearing end plate means having a bearing surface for journalling said rotary fluid-displacement means, a sealing surface for engaging an adjoining side face of said rotary fluid-displacement means, and a pressure receiving back surface forming together with means including a portion of said housing a pressure control chamber, said bearing surface being subject to load produced by pump-generated fluid pressures acting on the rotary fluid displacement means and having a center of load concentration shifted to one side when the rotary fluid-displacement means is operated and having a groove pattern formed therein at said center of load concentration to provide a reservoir, said sealing surface having a plurality of pockets disposed in an annular row and means placing said pressure control chamber, said reservoir and all of said pockets in pressure communication with said outlet, thereby to hydrostatically and hydrodynamically balance and lubricate the bearing end plate means.

8. In a high pressure pump, a housing having an inlet and an outlet and providing a pumping cavity, rotary fluid-displacement means in said pumping cavity for moving fluid from said inlet to said outlet, and bearing end plate means for said cavity in said housing, said bearing end plate means having a bearing surface for journalling and supporting said rotary fluid-displacement means, a sealing surface for engaging an adjoining side face of said rotary fluid displacement means and a pressure-receiving back surface forming together with means including a portion of said housing a pressure control chamber, said bearing surface being subject to load produced by pump-generated fluid pressures acting on the rotary fluid displacement means and having a center of load concentration shifted to one side when the rotary fluid displacement means is operated and having a groove pattern formed therein at said center of load concentration to provide a reservoir, said sealing surface having a circumferentially discontinuous recess formed therein circumjacent said bearing surface, said recess being discontinuous at that portion of said sealing surface axially opposite the center of load concentration, and means communicating pressure generated by said pump into said pressure control chamber, said reservoir, and said recess, thereby to hydrostatically and hydrodynamically balance and lubricate the bearing end plate means.

9. In a high pressure pump, a housing having an inlet and an outlet and providing a pumping cavity, rotary fluid displacement means in said cavity for moving fluid from the inlet to the outlet, and bearing end plate means for said cavity in said housing, said bearing end plate means having a bearing surface for journalling said rotary fluid displacement means, a sealing surface for engaging an adjoining side face of said rotary fluid displacement means, said bearing surface being subject to load produced by pump generated fluid pressures acting on the rotary fluid displacement means and having a center of load concentration shifted towards the inlet side of said bearing means, and recess means in said bearing surface forming a reservoir at said center of load concentration, and means communicating pressure by said pump into said recess means, said sealing surface having a segmental circumferential groove circumjacent said bearing surface, said sealing surface having a sealing area formed between opposite ends of said segmental groove axially opposite said center of load concentration, and means communicating pressure generated by said pump into said recess and into said segmental groove.

10. In a high pressure pump as defined in claim 9, said sealing surface having a second segmental groove formed therein concentrically outwardly of said first mentioned segmental groove and extending from the discharge side of said bushing means towards the inlet side of the pump to distribute the pressure forces acting on said sealing surface.

References Cited in the file of this patent
UNITED STATES PATENTS

| | | |
|---|---|---|
| 585,445 | Lumb | June 29, 1897 |
| 588,699 | Emery | Aug. 24, 1897 |
| 1,096,186 | Nesmith | May 12, 1914 |
| 1,271,970 | Wood | July 9, 1918 |
| 1,372,576 | Tullman | Mar. 22, 1921 |
| 1,379,587 | Fisher | May 24, 1921 |
| 1,682,842 | Hamer | Sept. 4, 1928 |
| 1,795,579 | Storey | Mar. 10, 1931 |
| 1,909,418 | Norwood | May 16, 1933 |
| 2,111,883 | Burghauser | Mar. 22, 1938 |
| 2,221,412 | Rose | Nov. 12, 1940 |
| 2,319,374 | Ungar | May 18, 1943 |
| 2,321,609 | Marco | June 15, 1943 |
| 2,479,077 | McAlvay | Aug. 16, 1949 |
| 2,527,941 | Lauck et al. | Oct. 31, 1950 |
| 2,571,377 | Olah | Oct. 16, 1951 |
| 2,578,711 | Martellotti | Dec. 18, 1951 |
| 2,624,287 | Ilyin | Jan. 6, 1953 |
| 2,649,740 | Murray et al. | Aug. 25, 1953 |
| 2,665,641 | Lauck | Jan. 12, 1954 |
| 2,673,767 | Schoeppner | Mar. 30, 1954 |
| 2,695,566 | Compton | Nov. 30, 1954 |
| 2,714,857 | Albright et al. | Aug. 9, 1955 |
| 2,718,758 | Minshall et al. | Sept. 27, 1955 |
| 2,746,394 | Dolza et al. | May 22, 1956 |
| 2,756,684 | Renzo | July 31, 1956 |
| 2,760,832 | Bidwell | Aug. 28, 1956 |